United States Patent
Srivastava et al.

(10) Patent No.: US 7,966,104 B2
(45) Date of Patent: Jun. 21, 2011

(54) APPARATUS AND METHOD FOR THE CONTROL OF THE INDOOR THERMAL ENVIRONMENT HAVING FEED FORWARD AND FEEDBACK CONTROL USING ADAPTIVE REFERENCE MODELS

(75) Inventors: Viraj Srivastava, Pittsburgh, PA (US); Chellury R. Sastry, South Brunswick, NJ (US); David H. Archer, Pittsburgh, PA (US)

(73) Assignee: Siemens Corporation, Iselin, NJ (US)

( * ) Notice: Subject to any disclaimer, the term of this patent is extended or adjusted under 35 U.S.C. 154(b) by 394 days.

(21) Appl. No.: 12/055,057

(22) Filed: Mar. 25, 2008

(65) Prior Publication Data
US 2009/0005912 A1 Jan. 1, 2009

Related U.S. Application Data

(60) Provisional application No. 60/896,950, filed on Mar. 26, 2007.

(51) Int. Cl.
*G05D 23/00* (2006.01)
(52) U.S. Cl. ........................................................ 700/299
(58) Field of Classification Search .......... 700/276–278, 700/299, 300
See application file for complete search history.

(56) References Cited

U.S. PATENT DOCUMENTS

| | | | | |
|---|---|---|---|---|
| 4,698,745 A * | 10/1987 | Hiroi et al. | ...................... | 700/45 |
| 5,796,920 A * | 8/1998 | Hyland | .......................... | 706/20 |
| 6,033,302 A * | 3/2000 | Ahmed et al. | ................ | 454/238 |
| 6,223,544 B1 * | 5/2001 | Seem | .............................. | 62/127 |
| 7,451,004 B2 * | 11/2008 | Thiele et al. | .................... | 700/28 |

OTHER PUBLICATIONS

Hunt, KJ; "Polynomial LQ Synthesis for Self-Tunning Control"; 1991; Advanced Methods in Adaptive Control for industrial Applications; vol. 158 pp. 110-127.*

* cited by examiner

*Primary Examiner* — Ramesh B Patel
*Assistant Examiner* — Chad Rapp

(57) ABSTRACT

A controller for controlling thermal sources affecting an air temperature in a space subjected to thermal variables, including a sensor network measuring the thermal variables; a feed forward controller generating a feed forward control signal based on an adaptive model including a model of the space and a model of the thermal sources, wherein the models are formed utilizing data from the sensor network; a feedback controller generating a feedback control signal based on a difference between an output of the feed forward controller and output from the space; and a combiner combining the feed forward and feedback control signals to produce a control signal for controlling the thermal sources to control the air temperatures of the space.

23 Claims, 5 Drawing Sheets

APPARATUS AND METHOD FOR THE CONTROL OF THE INDOOR THERMAL ENVIRONMENT HAVING FEED FORWARD AND FEEDBACK CONTROL USING ADAPTIVE REFERENCE MODELS

CROSS-REFERENCE TO RELATED APPLICATION

This application claims the benefit of provisional application Ser. No. 60/896,950, filed on Mar. 26, 2007 in the United States Patent and Trademark Office, the entire contents of which are herein incorporated by reference.

BACKGROUND OF THE INVENTION

1. Technical Field

The present disclosure relates to a control system for controlling an indoor thermal environment of a building, more specifically, to a control system having feed forward and feedback control loops using adaptive reference models.

2. Discussion of the Related Art

In the majority of economies world-wide, the building sector is the primary consumer of energy and a major contributor towards green house gas emissions. Currently, in the United States, the building sector accounts for up to 37% of all energy used, and 68% of all electricity.

The term "intelligent," when first used in the context of a building environment in the 1980s, referred to buildings with automation and control systems. Presently all buildings are expected to provide for individual productivity and comfort, organizational flexibility, technological adaptability, and environmental sustainability.

By simultaneously taking into account the demands of building occupants, owners, operators, and investors, an intelligent building is one that can automatically adjust its operating parameters in response to fluctuating inputs such as external light, temperature, humidity, air quality, occupancy patterns, etc. For example, heating ventilation and air-conditioning (HVAC) operation in hotels must automatically adjust their outputs depending on whether a room is currently rented or vacant. Preferably, occupants have the ability to customize and personalize indoor environment parameters based on their individual preferences.

An integrated advanced Building Automation and Control Systems (BACS) is important to meet the demands of occupant comfort and energy effectiveness in a sustainable building. It is desirable that BACS adapt to changing performance requirements caused by fluctuations in occupancy patterns and occupant requirements.

Building automation systems are expected to provide occupants with increased comfort through the ability to control the thermal and air quality at individual work spaces while minimizing energy usage and operational costs.

SUMMARY OF THE INVENTION

A controller is provided, according to an exemplary embodiment of the present invention, for controlling thermal sources affecting an air temperature in a space subjected to thermal variables, including a sensor network measuring the thermal variables; a feed forward controller generating a feed forward control signal based on an adaptive model including a model of the space and a model of the thermal sources, wherein the models are formed utilizing data from the sensor network; a feedback controller generating a feedback control signal based on a difference between an output of the feed forward controller and output from the space; and a combiner combining the feed forward and feedback control signals to produce a control signal for controlling the thermal sources to control the air temperatures of the space.

A method is provided, according to an exemplary embodiment of the present invention, for controlling thermal sources affecting an air temperature in a space subjected to thermal variables, including measuring the thermal variables; generating a feed forward control signal based on an adaptive model including a model of the space and a model of the thermal sources, wherein the models are formed utilizing the measured thermal variables; generating a feedback control signal based on a difference between the feedback control signal and an output from the space; and combining the feed forward and feedback control signals to produce a control signal for controlling the thermal sources to control the air temperature of the space.

BRIEF DESCRIPTION OF THE DRAWINGS

A more complete appreciation of the present disclosure and many of the attendant aspects thereof will be readily obtained, as the same becomes better understood by reference to the following detailed description, when considered in connection with the accompanying drawings, wherein.

DETAILED DESCRIPTION OF EXEMPLARY EMBODIMENTS

Figure 1:
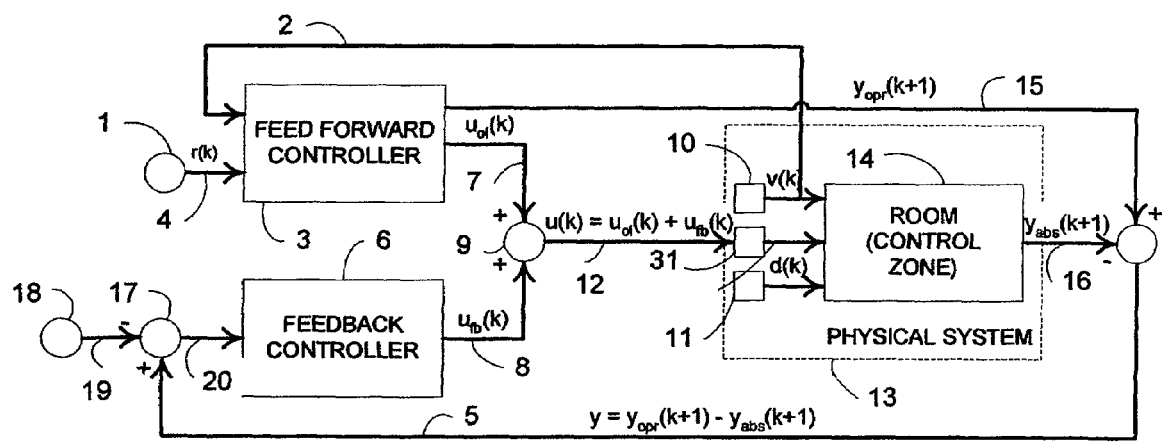
FIG. 1 is a block diagram illustrating a control system integrating feed forward and feedback control loops, according to an exemplary embodiment of the present invention.

In describing exemplary embodiments of the present disclosure illustrated in the drawings, specific terminology is employed for the sake of clarity. However, the present disclosure is not intended to be limited to the specific terminology so selected, and it is to be understood that each specific element includes all technical equivalents which operate in a similar manner.

Exemplary embodiments of the present invention seek to provide a control process and apparatus for providing thermal comfort in a building, for example, by applying feed forward and feedback control loops using adaptive reference models.

Exemplary embodiments of the present invention relate to control systems, designed for heating, ventilation and air conditioning. The service quality of the control systems, according to the exemplary embodiments of the present invention, is enhanced by changing the way high-resolution data-driven building systems are modeled using real-time data from a distributed sensor network deployed in the building. Specifically, the performance of control systems is improved by augmenting predictive (feed-forward) control operations with adaptive models.

A control process for heating, ventilating, and air-conditioning (HVAC), according to an embodiment of the present invention, integrates conventional feedback control with an advanced feed forward control algorithm. The feed forward algorithm uses dynamic as well as steady state sensor-based models updated in real time during regular operation of the systems. The models may represent the building as well as the equipment to take into account multiple measured and unmeasured variables that affect conditions in buildings. The models may include objective functions to improve control of indoor environmental conditions in buildings with respect to occupant comfort, rapid system response, lower installed cost, and reduced cost of operation.

HVAC control algorithms are typically reactive (feedback control). A problem with such controllers common feedback control (such as a thermostatic control) is the process delay time—the delay between the application of a control effort (e.g. the actuation of a cooling device) and its effect on the controlled variable (e.g. air temperature in a space). During that interval, the controlled variable may not respond sufficiently to the controller's activity leading to overcompensation, oscillatory behavior and high energy use with low comfort conditions. How extensively the controller overcompensates depends on how aggressively it is tuned, and on the difference between the actual and the assumed delay time. The problem posed by the delay time may be countered using feed-forward controllers that continuously calculate the actuation signal necessary to maintain steady conditions using information about measured disturbances.

Feed-forward controllers that incorporate a process model require tuning the parameters of this model to the actual conditions in the space. Adaptive techniques may be used to automatically adapt a controller to the process. The desire to use adaptive control for HVAC processes is often motivated by the following situation—a non-adaptive feedback controller, e.g. a PI controller, may lead, depending on the operating point, to a problematic control performance quality; good performance at or near the operating point at which the controller was tuned, and oscillatory or sluggish control performance for other operating points. The reason lies in the non-linear behavior of the process, including limits on response rates and thermal capacities. As a consequence, linearizing the process model to approximate the behavior of the process near an operating point is not valid over larger operating ranges (such as those in a building) that is, the actual response can vary significantly as the operating point changes. The adaptation unit of an adaptive controller adapts the controller to this time varying, linearized process model.

A key driver of the building automation market is the possibility of facilitating increased and personalized thermal control (and hence increased comfort) while adhering to constraints of energy usage. Based on standard physical considerations, it is possible to establish satisfactory environmental conditions for goods, machinery, and processes; however, determining 'thermal comfort' for humans is complex. Thermal comfort for humans depends not only on air temperature, but also on humidity, air flow, and radiant temperature, as well as on the individual person (psychological factors).

In order to be accepted by occupants, sensor measurements to determine thermal comfort must be collected non-intrusively.

In an exemplary embodiment of the present invention, Micro-Electro-Mechanical Systems (MEMS) provide for fine-grained, localized sensing of an indoor environment for various physical attributes such as temperature, humidity, carbon dioxide level, occupancy level etc. MEMS use the electrical and mechanical properties of silicon chips. Several sensing layers are placed on one silicon sensor. Wireless communication, microcontroller and power management are integrated on a single platform. This platform can facilitate a plug-and-play sensor suite that can be adapted to any application.

MEMS-based sensors are less susceptible to faults and are more cost-effective than current sensors, providing for increased sensing. In addition, a MEMS platform includes the ability to filter and process data using an onboard microcontroller. For example, sensed data may only be sent when there is a significant (pre-programmed) change in the sensed variable.

A MEMS Microsystem network consists of organizing multi-array sensing nodes in a mesh topology that typically communicate with each other wirelessly in the radio frequency (RF) spectrum. Microsystem networks are also referred to as sensor networks or machine-to-machine (M2M) networks. The fine-grained measurements of an indoor environment through Microsystem networks may be incorporated in advanced model reference control algorithms resulting in energy-effective, localized and personalized control of the environment surrounding building occupants.

Typical PID systems provide feedback control only and control a single manipulated variable. Traditionally, to prevent overshoot, the system is slowed by reducing ("detuning") the feedback control gains. Feed-forward building control strategies that rely on the predictive capacity of embedded knowledge sources overcome some limitations of feedback control systems.

In Model Reference Adaptive Control (MRAC) systems, the desired behavior of the system (that may be multi-input multi-output) is specified by a model. The general idea behind such systems is to create a closed-loop controller with parameters that can be updated to change the response of the system. The measured outputs of the system are compared to the desired response from a reference model and the control parameters are updated based on this observed difference.

MRAC technology offers significant capabilities, such as the ability to conveniently store the desired response of the system in a reference model. However, parametric models are seldom supported. Techniques such as real-time system identification, adaptive lookup tables, and databases of system performance provide methods to infer mathematical models from observed data and provide frameworks to store information about system performance.

The process model, according to an exemplary embodiment of the present invention, encapsulates the thermal characteristics of a particular control zone (air/radiant temperature, humidity distribution, air velocity, lighting, occupancy distribution, etc.) as learned from actual system performance. These characteristics are a function of different manipulated (controlled) thermal sources (fan coil units, air handlers), as well as disturbances (uncontrollable sources) such as conditions at the physical boundaries (adjacent spaces), occupants and equipment. The measured disturbances (e.g. outdoor air temperature) are used for feed-forward control. Measured manipulated output variables (e.g. space air temperature) are used for the feedback loop. The feedback loop takes into account disturbances that cannot be measured but do affect the space, e.g. door aperture in a closed office.

The correlation analysis and state identification processes are executed at control time steps with a minimum dwell time (to prevent oscillations). Parameter identification is clock driven since the computation time is high. Diagnostic algorithms are run at varying time steps based on computation time. This use of state identification (also referred to as context identification), mode switching, and parameter estimation will be described below.

Thermodynamic models for buildings (see Equations 1, 2, and 3 below) describe the variables and their parameters required for determining thermal conditions in a control zone. The parameters are often estimated from thermodynamic information (e.g. material properties, heat transfer coefficients) with the exact operational values unknown. This leads to "rule of thumb" values to be used or variables even being ignored (e.g. the influence of thermal conditions in a control zone on other spatially adjacent zones in an open plan office) hindering feed-forward control.

$$\frac{dT_z}{dt} = \frac{1}{C_z}\sum Q_i + \frac{1}{C_z}\sum h_i A_i (T_{si} - T_z) + \qquad (1)$$

$$\frac{1}{C_z}\dot{m}_{inf} C_p (T_\infty - T_z) + \frac{1}{C_z}\dot{m}_i C_p (T_{zi} - T_z) + \frac{1}{C_z}\dot{Q}_{sys}$$

$$\frac{dT_{oi}}{dt} = \frac{hA}{C}T_\infty - \frac{hA}{C}T_{oi} + \frac{1}{RC}T_{si} \qquad (2)$$

$$\frac{dT_{si}}{dt} = \frac{hA}{C}T_z - \frac{hA}{C}T_{oi} + \frac{1}{RC}T_{si} \qquad (3)$$

The following variables are used in Equation 1, 2 and 3:

Manipulated variables- $\dot{Q}_{sys}$- Energy supplied by the heating/cooling system;

Measured output variable $T_z$- Indoor air temperature to be controlled;

Measured disturbances $T_{si}$- Average surface temperature of internal surfaces;

$T_{oi}$- Average surface temperature of external surfaces;

$Q_i$- Sum of internal convective loads;

Model parameters $C_z$- Capacitance of air;

$A_i$- Area of space surfaces;

$R$- Resistance of building envelope;

$C$- Thermal capacity of building envelope;

$h_i$- Average heat transfer coefficient for the space surfaces;

$\dot{m}_i$- Heat transfer coefficient for inter space mixing(a);

$\dot{m}_{inf}$- Heat transfer coefficient for ventilation air;

To utilize the above model with Microsystem inputs arriving at discrete time intervals. Equations 1, 2, and 3 are discretized and cast into a standard auto-regressive moving average model with external inputs (ARX). But since the model parameters are unknown to begin with, system identification methods are invoked that use data from deployed Microsystems to estimate and tune these parameters.

Robust system identification methods have proved successful in devising accurate models of complex systems (e.g. multi zone building environments). MRAC systems based on identified models are thus able to operate successfully even if the initial information provided is inaccurate.

With an initial model structure as defined by Equations 1, 2, and 3, and parameters estimated based on Microsystem outputs, the model according to our exemplary embodiment of the present invention, is enhanced by incorporating additional variables that contribute to thermal conditions in a control zone but were previously considered too complex for traditional methods.

Mode switching may be employed to further augment the model selection strategy, as will be described below.

To overcome limitations posed by static parameters used in traditional MRAC models, principles of system identification are used to estimate and update the parameters of the model in real time based on actuator and sensor (Microsystem) data from the control zone.

To continuously and recursively update the model parameters, a recursive Kalman Filter may be utilized that is implemented based on the discretized ARX version of Equations 1, 2, and 3 as a state model, and a measurement equation derived from relating the Microsystem measurements to the state variables.

To validate and authenticate the parameter estimates from the Kamlan filter, rule based algorithms and comparisons to historical data may be employed to determine if the estimated parameters for a specific operation state are valid or if they represent anomalous system behavior. For example, the estimated parameter vector would be invalid if it contradicts thermodynamic principles in the space. In such a situation an alarm would be raised. If valid, the updated parameters are stored in a lookup table organized based on operating states.

In control zones that are spatially connected, thermal conditions in one space affect the thermal conditions in another space. For example, a thermal source in one room will have an impact on the temperature of an adjacent room that shares an open through way (because of the free flow of air).

To analytically study the dependencies between various data streams, we first represent data from the deployed Microsystems (data includes temperatures, humidity, occupancy, etc. at different zones) as vector-valued multivariate time series. The cross correlation between two time series say $x = [x(t) x(t-1), \ldots]'$ (' denotes transpose) and $y = [y(t) y(t-1), \ldots]'$ measures the dependency of $x(t)$ on $y(t-1)$, $y(t-2) \ldots$. Thus, by examining the correlation between streams of data representing manipulated variables (e.g. space air temperature) and streams of actuation signals (e.g. valve and fan commands) and measured disturbances (e.g. outdoor air temperature, occupancy), the dependencies between the data streams are captured. For example, if it is determined through cross correlation that ambient temperature in a zone is dependent on occupancy levels in that zone, then as occupancy increases, air temperature will also increase, albeit with some delay. This then suggests that occupancy be included as an input variable in any model that describes the variation of temperature in a zone.

The cross-correlation between variables is used to determine variables that are coupled mathematically (present in the same equation), coupled computationally (calculated at the same time), and those that are not coupled.

In control zones that are spatially disconnected, thermal conditions in one space may have little or no affect on thermal conditions in another space and therefore the variables will not be coupled. Therefore, this technique reduces computation time for the control algorithm by limiting the number of variables in one computation.

Thermal response characteristics of buildings change with time, e.g. the thermal response rate changes with changes in humidity. This reality is reflected by considering the parameters in the model as time varying. Furthermore, the deployed Microsystem data may also be time dependent. This variance is represented through a different set of parameters referred to as a mode switch for the model for different operating modes (summer/winter, occupied/unoccupied) of the building. This switch may be triggered by the controller (controlled switch); or by the continuous state of the system as it reaches a set threshold (autonomous switch).

Autonomous switching may be used through specified thresholds (e.g., combinations of occupancy conditions, weather conditions and indoor conditions). A change in state triggers a mode switch. Lookup tables (initialized offline) may be used to select the next parameter set.

FIG. 1 shows a control system integrating feed forward and feedback control loops according to an exemplary embodiment of the present invention.

A building space or room (control zone) 14 is subject to a physical system 13. The physical system 13 subjects the control zone 14 to measurable disturbances 10 and unmeasurable disturbances 11. The measurable disturbances 10 may be measured, by way of example, with the MEMS-based sensors described above, or other type of sensors.

Thermal conditions in the control zone 14 are affected by different controllable thermal sources 31, such as fan coil units, and uncontrolled but measurable thermal sources 10, such as outdoor weather, solar radiation, presence or absence of an occupant, and air temperature in a different space.

The unmeasurable sources 11 that may affect the thermal conditions in the control zone 14 include the number of occupants present in the space, heat generated by office equipment, and artificial lighting in the space, for example.

The thermal sources 10, 11 are variables representing operating conditions during the normal operation of the building space 14. These variables are treated as disturbances by the control algorithm or process according to an exemplary embodiment of the present invention.

A feed forward controller 3 uses a process based on a model based feed forward algorithm that generates a control signal 7 based on measurements of disturbances 2 that affect the thermal state of the control zone 14.

A feedback controller 6 uses a process based on a conventional feedback algorithm that generates a control signal 8 based on measured system variables 16, such as ambient air temperature.

The feed forward controller 3, addresses disturbances that are measured 10 and whose effect on the thermal state of the space is known, such as solar radiation.

The feedback controller 6, operates on the difference 5 of the expected output 15 from the feed forward controller 3 and the actual measured output 16 from the control zone 14. Thus, the feedback controller 6, addresses disturbances 11 whose effect on the thermal state of the control zone 14 is not known.

Figure 5:
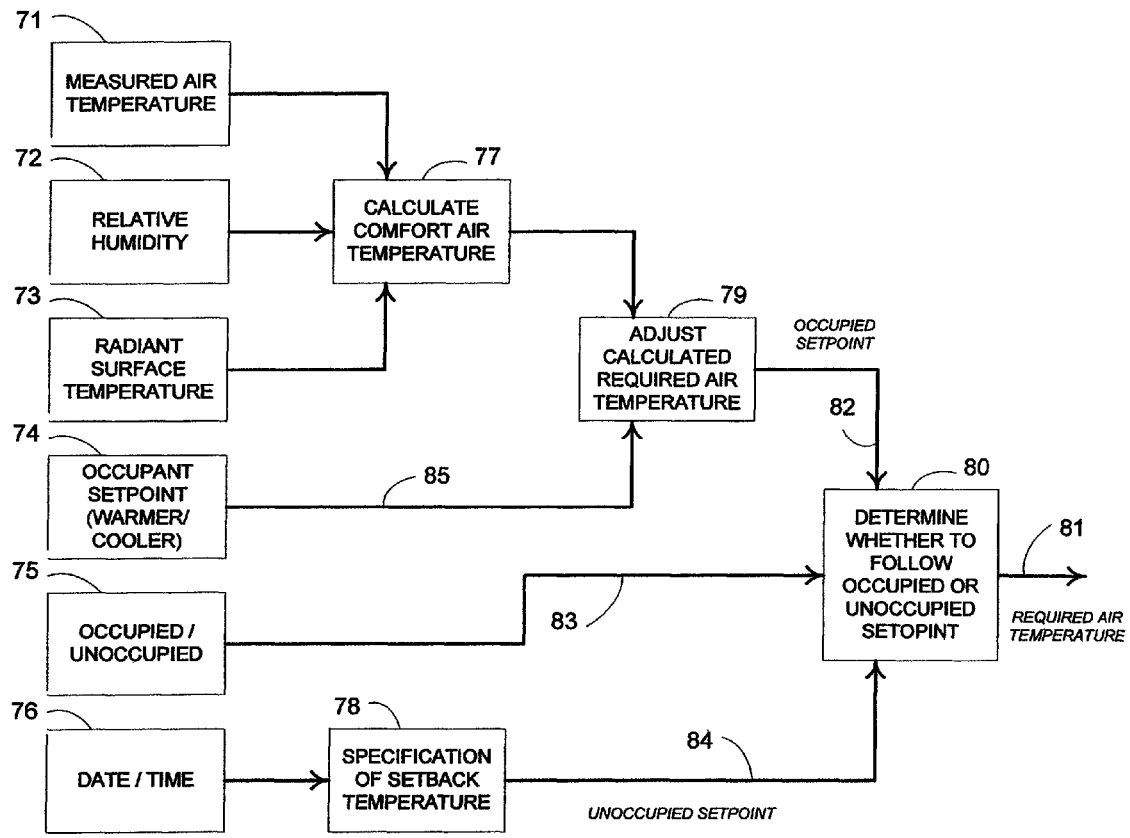
FIG. 5 is a block diagram illustrating a process for determining a comfort temperature, according to an exemplary embodiment of the present invention.

The feed forward controller 3 receives as inputs the values of the measured disturbances 2 and a reference variable 4 such as a setpoint. The process 1 for calculating the reference variable 4 will be described later with reference to FIG. 5.

Figure 2:
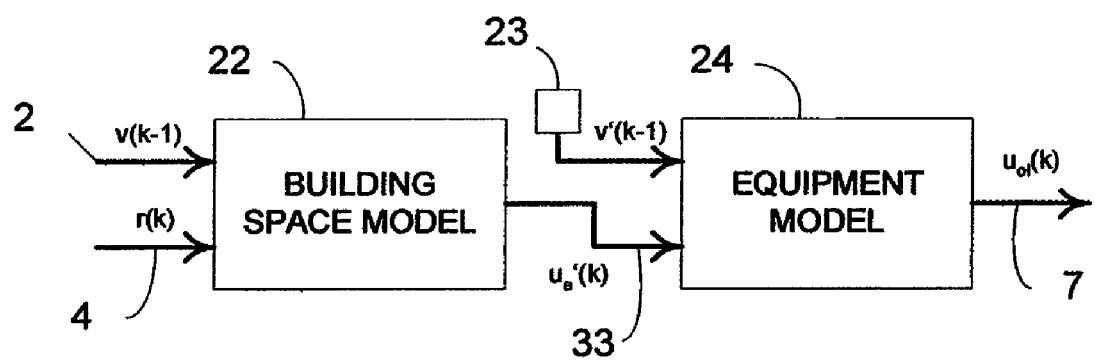
FIG. 2 is a block diagram illustrating details of the feed forward loop of FIG. 1, according to an exemplary embodiment of the present invention.

The feed forward process performed in the feed forward controller 3 further includes two subprocesses that use a building space model 22 and an equipment model 24, as shown in FIG. 2.

The building space model 22 contains descriptions of space geometry, fenestration details, and material properties of the control zone 14. A lumped component model is used to simplify the behavior of the spatially distributed system into a topology consisting of discrete entities that approximate the behavior of the distributed system under certain assumptions.

The building space model 22 is inverted, exercising this inverted model of the space, and using as inputs the reference variable (e.g. setpoint) 4 and the measured values of the disturbances 2 that affect the thermal state in the space, outputs the amount of thermal energy 33 required to counter those disturbances 2.

The typical building space model based on engineering fundamentals was expressed in Equations 1, 2, and 3 above.

The equipment model 24 is created using HVAC performance data from manufacturers, engineering fundamentals, or lookup tables.

The equipment model 24 is inverted, exercising the inverted model of the HVAC equipment, and using as inputs the quantity of thermal energy 33 required and the current operating state of the equipment 23, outputs an estimation of the actuation signal 7.

Turning back to FIG. 1, the feedback controller 6 operates on the difference 5 of the output 15 of the feed forward controller 3 and the actual measured output 16 from the control zone 14.

A regulator 18 is used to specify a weight 19 of the feedback process. The weight 19 is substracted 17 from the difference 5 and the output 20 is input to the feedback controller 5.

The actuation signal 7 from the feed forward controller 3 and the output of feedback controller 8 are averaged 9 and output 12 to the HVAC equipment serving the control zone 14.

The control algorithm according to an exemplary embodiment of the present invention effectively controls multiple sources of thermal energy in situations where every state of the system may have multiple responses with the same short-term effects but different long-term effects. Typical control algorithms consist of multiple independent processes each of which manage a single control element with minimal communication between the processes, whereas the control algorithm according to an exemplary embodiment of the present invention is capable of effectively managing multiple sources (i.e. multiple handles or multiple actuation points).

An example of managing multiple sources is a situation where a high energy device causes the controlled variable to respond faster than a low energy device, then the model is used to predict the transient response and energy usage of the control options. High energy devices are actuated first, to bring the controlled variable within the tolerance band and the low energy device is actuated second to bring the variable closer to the set point.

Figure 4:
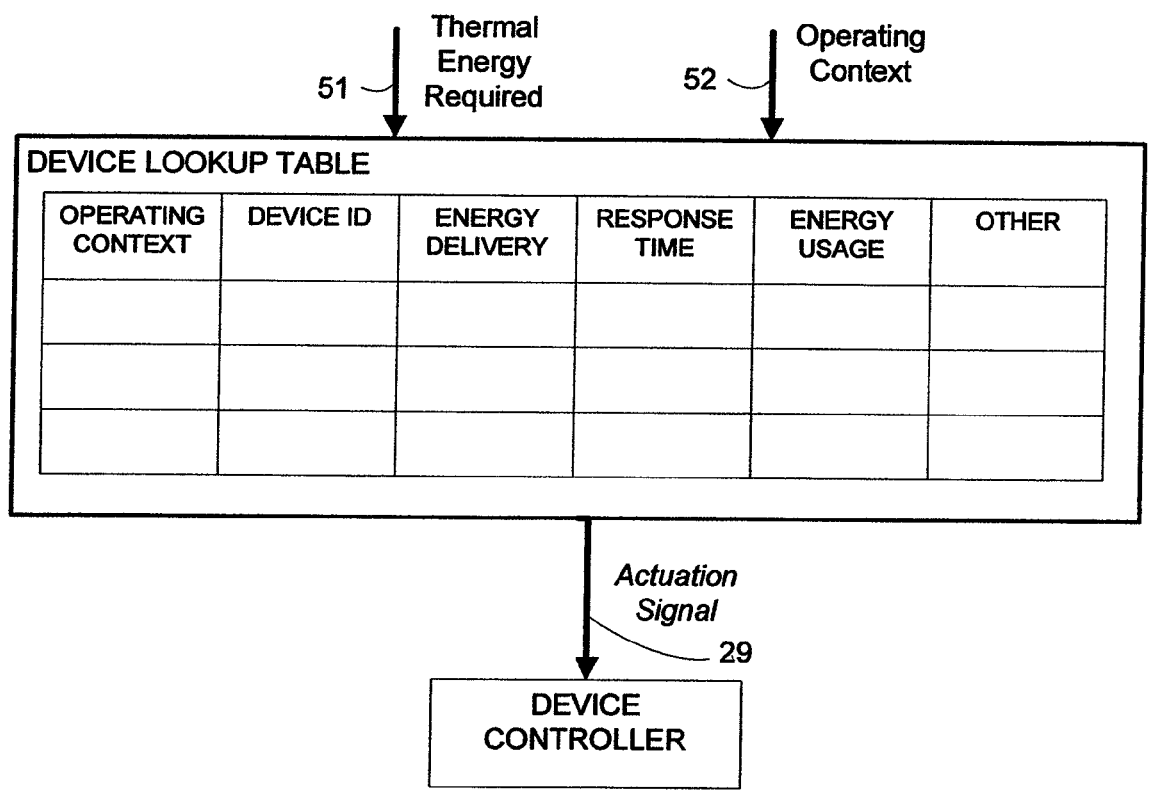
FIG. 4 is an illustration of a model archive lookup table, according to an exemplary embodiment of the present invention.

Such a scheme is achieved through the use of a lookup table shown in FIG. 4. The table, has as inputs the thermal energy required 51 and the operating context 52, and includes the device characteristics including energy delivery capacity, energy usage, and response time, for example. An actuation signal 29 is output.

The process for determining the setpoint temperature or reference variable 4, sown in FIG. 1, will be described.

Traditional HVAC control systems determine the required air temperature based on a preset value (e.g. set by the building manager) or by a set point specified by the occupant (e.g. occupants sets the temperature on a thermostat to 72 F). Here, instead of only air temperature, a process (1 in FIG. 1, and FIG. 5) is used that better represents if a person is comfortable to determine the required air temperature to be used as the reference variable 4. Given a measurement of the current air temperature in the space 71, relative humidity 72 and radiant surface temperature 73, it is possible to calculate in 77 the air temperature required based on established comfort standards. A seasonal component is also included in the calculation to arrive at the required Comfort Temperature air temperature.

The occupant's input 74 of warmer or cooler temperature 85 is used to modify the calculated required air temperature in 79. In this way, the occupant's feeling of comfort, is converted into a tangible input 82 and is used to calibrate physical measurements in the space.

For reducing energy usage it is desirable that the band for setback temperatures be as wide as possible, and that comfort conditions are met as soon as possible, while observing constraints for discharge air temperature and equipment capabilities.

The air temperature required in the building space 81 is further determined in 75 by the presence (occupied mode) or absence of an occupant 83 and time of day 76 (within work hours/outside work hours) in 80. E.g. if the space is unoccupied during work hours, the required air temperature will be setback in 78 to ensure fastest response time, whereas outside work hours the required air temperature will be setback further to minimize energy usage.

Therefore, the setback temperature in an unoccupied space 84 is based on time of day. During working hours a narrow band of setback temperature 82 is used to ensure minimum time lag to return to the setpoint temperature while reducing energy usage. Whereas, outside work hours, a wider band is maintained to reduce energy usage. In this situation preference is given to the setpoint set by central controller.

Figure 3:
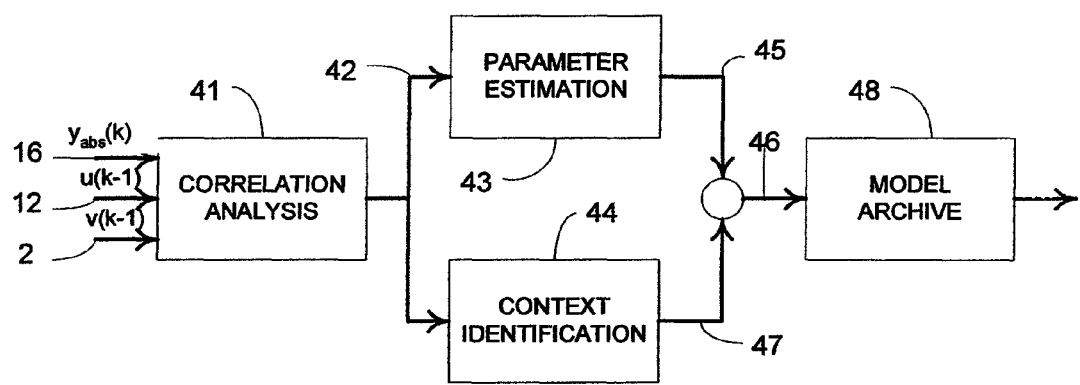
FIG. 3 is a block diagram illustrating a process for updating the models of FIG. 2, according to an exemplary embodiment of the present invention.

The correlation analysis, parameter estimation, and context identification described above and used to update the model is illustrated in FIG. 3.

A cross-correlation analysis between variables measured 16 by sensors installed in the control zone 14, the measured values of disturbances 2 in the physical system 13 that affect the control zone 14, and the actuation signals 12 sent to the HVAC equipment 31 conditioning the control zone 14, are used to determine variables that are coupled mathematically, coupled computationally and those that are not coupled.

Groups of correlated variables 42 are sent to the parameter estimation process 43, and the context identification process 44.

An output 45 of the parameter estimation process 43 described above, and an output 47 of the context identification process 44, representing the state of the system, are combined 46 and sent to the model archive 48 for updating the model.

The control methods described by way of exemplary embodiment of the present invention, provide significant improvements over previously proposed methods in achieving effective operation of building systems, in particular, those related to heating, ventilation and air conditioning (HVAC).

Having described exemplary embodiments of the present invention, it is to be understood that the invention is not limited to the disclosed embodiment, but, on the contrary, is intended to cover various modifications and equivalent arrangements included within the spirit and scope of the disclosure.

What is claimed is:

1. A controller for controlling thermal sources affecting an air temperature in a space subjected to thermal variables, comprising:
   a sensor network measuring the thermal variables;
   a feed forward controller generating a feed forward control signal based on an adaptive model including a model of the space and a model of the thermal sources, wherein the models are formed utilizing data from the sensor network;
   a feedback controller generating a feedback control signal based on a difference between an output of the feed forward controller and output from the space; and
   a combiner averaging the feed forward and feedback control signals to produce a combined control signal for controlling the thermal sources to control the air temperatures of the space.

2. The controller of claim 1, wherein the models are updated using past system performance.

3. The controller of claim 2, wherein the thermal variables measured by the sensor network include outdoor air temperature, indoor air temperature, humidity, and radiant surface temperature.

4. The controller of claim 3, wherein the adaptive model of the feed forward controller uses the outdoor air temperature, indoor air temperature, humidity, and radiant surface temperature to calculate a comfort air temperature setpoint.

5. The controller of claim 4, wherein the feed forward controller includes as an input the calculated comfort air temperature setpoint.

6. The controller of claim 4, wherein the model of the space outputs a calculated quantity of thermal energy required using the calculated comfort air temperature setpoint and the thermal variables measured by the sensor network, and the calculated quantity of thermal energy required is output to the model of the thermal sources.

7. The controller of claim 1, wherein the thermal sources include fan coil units, radiant systems, and air handlers.

8. The controller of claim 7, wherein the thermal sources are activated in a sequence based on their respective energy consumptions and response times.

9. The controller of claim 1, wherein the feed forward controller includes as air input the thermal variables measured by the sensor network.

10. The controller of claim 1, wherein one of the models include a model of equipment within the space, and wherein the model of the equipment is formed using performance data of the equipment.

11. The controller of claim 1, wherein the model of the space includes mode switching.

12. A method for controlling thermal sources affecting an air temperature in a space subjected to thermal variables, comprising:
   measuring the thermal variables;
   generating a feed forward control signal based on an adaptive model including a model of the space and a model of the thermal sources, wherein the models are formed utilizing the measured thermal variables;
   generating a feedback control signal based on a difference between the feedback control signal and an output from the space; and
   averaging the feed forward and feedback control signals to produce a combined control signal for controlling the thermal sources to control the air temperature of the space.

13. The method of claim 12, wherein the models are updated using past system performance.

14. The method of claim 13, wherein the thermal variables include outdoor air temperature, indoor air temperature, humidity, and radiant surface temperature.

15. The method of claim 14, wherein the adaptive model uses the outdoor air temperature, indoor air temperature, humidity, and radiant surface temperature to calculate a comfort air temperature setpoint.

16. The method of claim 15, wherein the model of the space outputs a calculated quantity of thermal energy required using the calculated comfort air temperature setpoint and the measured thermal variables, and the calculated quantity of thermal energy required is input to the model of the thermal sources.

17. The method of claim 12, wherein the thermal sources include fan coil units, radiant systems, and air handlers.

18. The method of claim 12, wherein one of the models include a model of equipment within the space, and wherein the model of the equipment is formed using performance data of the equipment.

19. An apparatus for controlling thermal sources affecting an air temperature in a space subjected to thermal variables, comprising:

a sensor network measuring the thermal variables;

a feed forward controller generating a feed forward control signal based on an adaptive model formed utilizing data from the sensor network;

a feedback controller generating a feedback control signal based on a difference between an output of the feed forward controller and a thermal output from the space; and a combiner averaging the feed forward and feedback control signals to produce a combined control signal for controlling the thermal sources to control the air temperatures of the space.

20. The apparatus of claim 19, wherein the adaptive model includes a model of the space and a model of the thermal sources.

21. The apparatus of claim 19, wherein the adaptive model is updated using historical data measured by the sensor network.

22. The apparatus of claim 21, wherein the adaptive model uses a lookup table.

23. The apparatus of claim 19, wherein the space is a building and includes a plurality of rooms.

* * * * *